United States Patent
Kishizoe (10) Patent No.: US 11,524,526 B2
(45) Date of Patent: Dec. 13, 2022

(54) PNEUMATIC TIRE

(71) Applicant: The Yokohama Rubber Co., LTD., Tokyo (JP)

(72) Inventor: Isamu Kishizoe, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 304 days.

(21) Appl. No.: 16/307,910

(22) PCT Filed: Jul. 7, 2017

(86) PCT No.: PCT/JP2017/025040
§ 371 (c)(1),
(2) Date: Dec. 6, 2018

(87) PCT Pub. No.: WO2018/012438
PCT Pub. Date: Jan. 18, 2018

(65) Prior Publication Data
US 2019/0176534 A1    Jun. 13, 2019

(30) Foreign Application Priority Data

Jul. 12, 2016   (JP) .............................. JP2016-137680

(51) Int. Cl.
*B60C 11/03*    (2006.01)
*B60C 11/12*    (2006.01)
*B60C 11/13*    (2006.01)

(52) U.S. Cl.
CPC .......... *B60C 11/1204* (2013.01); *B60C 11/03* (2013.01); *B60C 11/033* (2013.01);
(Continued)

(58) Field of Classification Search
CPC ..... B60C 2011/0358; B60C 2011/0348; B60C 2011/0372; B60C 2011/0381; B60C 2011/0383
See application file for complete search history.

(56) References Cited

U.S. PATENT DOCUMENTS 4,635,694 A * 1/1987 Hosokawa .......... B60C 11/0306
                                                152/209.9
6,474,381 B1   11/2002 Tsuda
(Continued)

FOREIGN PATENT DOCUMENTS

JP            3682269        8/2005
JP         2006-232151       9/2006
(Continued)

OTHER PUBLICATIONS

European Office Action for European Application No. 17827566.5 dated Jan. 21, 2020, 42 pages, Germany.
(Continued)

*Primary Examiner* — Timothy Kennedy
*Assistant Examiner* — Farah Taufiq
(74) *Attorney, Agent, or Firm* — Thorpe North & Western (57) ABSTRACT

A pneumatic tire includes two circumferential main grooves disposed in the region on one side of a tire equatorial plane as a boundary and a land portion defined by the two circumferential main grooves. The land portion includes a circumferential narrow groove extending in the tire circumferential direction and sets of a first and a second lug groove extending in the tire lateral direction through the circumferential narrow groove. The first lug groove includes an end portion that opens to the edge portion on one side of the land portion and another end portion that terminates within the land portion. The second lug groove includes an end portion that opens to the edge portion on the other side of the land portion and an end portion that terminates within the land portion. The first lug groove and the second lug groove are alternately disposed in the tire circumferential direction.

16 Claims, 6 Drawing Sheets

(52) U.S. Cl.
CPC .......... *B60C 11/0306* (2013.01); *B60C 11/12* (2013.01); *B60C 11/1236* (2013.01); *B60C 11/13* (2013.01); *B60C 2011/0348* (2013.01); *B60C 2011/0365* (2013.01); *B60C 2011/0372* (2013.01); *B60C 2011/0381* (2013.01); *B60C 2011/1213* (2013.01); *B60C 2011/1254* (2013.01)

(56) References Cited

U.S. PATENT DOCUMENTS

| | | | |
|---|---|---|---|
| 2003/0226629 A1* | 12/2003 | Kimishima | B60C 11/0306 152/209.18 |
| 2007/0089821 A1 | 4/2007 | Kishizoe | |
| 2012/0305155 A1 | 12/2012 | Hamanaka | |
| 2016/0152092 A1* | 6/2016 | Sasaki | B60C 11/0304 152/209.18 |
| 2016/0193886 A1* | 7/2016 | Iwasaki | B60C 11/0306 152/209.24 |
| 2017/0361659 A1 | 12/2017 | Yamakawa | |
| 2018/0281526 A1* | 10/2018 | Muhlhoff | B60C 11/0306 |

FOREIGN PATENT DOCUMENTS

| | | |
|---|---|---|
| JP | 2007-186121 | 7/2007 |
| JP | 2009-161046 | 7/2009 |
| JP | 2009-161112 | 7/2009 |
| JP | 2009161046 A * | 7/2009 |
| JP | 2012-250610 | 12/2012 |
| JP | 2015-044583 | 3/2015 |
| JP | 5686955 | 3/2015 |
| JP | 2015-074289 | 4/2015 |
| JP | 2016-104592 | 6/2016 |
| WO | WO 2016/088621 | 6/2016 |

OTHER PUBLICATIONS

International Search Report for International Application No. PCT/JP2017/025040 dated Sep. 19, 2017, 4 pages, Japan.

* cited by examiner

| | CONVENTIONAL EXAMPLE | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 |
|---|---|---|---|---|---|---|---|---|---|---|---|
| N1/Nsh (NUMBER) | 56/56 | 112/56 | 112/56 | 112/56 | 112/56 | 112/56 | 112/56 | 112/56 | 112/56 | 112/56 | 112/56 |
| FIRST LUG GROOVE A OF SECOND LAND PORTION | DOES NOT EXTEND THROUGH ON ONE SIDE | DOES NOT EXTEND THROUGH ON ONE SIDE | DOES NOT EXTEND THROUGH ON ONE SIDE | DOES NOT EXTEND THROUGH ON ONE SIDE | DOES NOT EXTEND THROUGH ON ONE SIDE | DOES NOT EXTEND THROUGH ON ONE SIDE | DOES NOT EXTEND THROUGH ON ONE SIDE | DOES NOT EXTEND THROUGH ON ONE SIDE | DOES NOT EXTEND THROUGH ON ONE SIDE | DOES NOT EXTEND THROUGH ON ONE SIDE | DOES NOT EXTEND THROUGH ON ONE SIDE |
| SECOND LUG GROOVE B OF SECOND LAND PORTION | EXTENDS THROUGH | DOES NOT EXTEND THROUGH ON ONE SIDE | DOES NOT EXTEND THROUGH ON ONE SIDE | DOES NOT EXTEND THROUGH ON ONE SIDE | DOES NOT EXTEND THROUGH ON ONE SIDE | DOES NOT EXTEND THROUGH ON ONE SIDE | DOES NOT EXTEND THROUGH ON ONE SIDE | DOES NOT EXTEND THROUGH ON ONE SIDE | DOES NOT EXTEND THROUGH ON ONE SIDE | DOES NOT EXTEND THROUGH ON ONE SIDE | DOES NOT EXTEND THROUGH ON ONE SIDE |
| INCLINATION DIRECTION OF LUG GROOVE A, B | SAME DIRECTION | OPPOSITE DIRECTION | OPPOSITE DIRECTION | OPPOSITE DIRECTION | OPPOSITE DIRECTION | OPPOSITE DIRECTION | OPPOSITE DIRECTION | OPPOSITE DIRECTION | OPPOSITE DIRECTION | OPPOSITE DIRECTION | OPPOSITE DIRECTION |
| θ (DEGREES) | 70 | 70 | 45 | 80 | 70 | 70 | 70 | 70 | 70 | 70 | 70 |
| NARROW WIDTH PORTION OF LUG GROOVE | NO | NO | NO | NO | YES | YES | YES | YES | YES | YES | YES |
| Wg2/Wg1 | 1.00 | 1.00 | 1.00 | 1.00 | 0.20 | 0.50 | 0.70 | 0.50 | 0.50 | 0.50 | 0.50 |
| D2/Wb2 | - | - | - | - | 0.30 | 0.30 | 0.30 | 0.25 | 0.45 | 0.30 | 0.30 |
| D1/Wb1 | 0.30/1.00 | 0.30 | 0.30 | 0.30 | 0.30 | 0.30 | 0.30 | 0.30 | 0.30 | 0.50 | 0.65 |
| BRAKING PERFORMANCE ON ICE | 100 | 110 | 106 | 110 | 116 | 115 | 112 | 113 | 117 | 120 | 120 |
| TURNING PERFORMANCE ON ICE | 100 | 107 | 107 | 103 | 110 | 112 | 114 | 111 | 113 | 115 | 117 |
| STEERING STABILITY PERFORMANCE ON SNOW | 100 | 105 | 103 | 103 | 104 | 105 | 106 | 106 | 104 | 105 | 106 |

FIG. 6

PNEUMATIC TIRE

TECHNICAL FIELD

The technology relates to a pneumatic tire and particularly relates to a pneumatic tire that can provide performance on snow and performance on ice in a compatible manner.

BACKGROUND ART

A studless tire is required to have good performance on snow and performance on ice. The technologies described in Japan Patent Nos. 3682269 and 5686955 as well as Japan Unexamined Patent Publication No. 2015-074289 are known studless tires in the related art.

SUMMARY

The technology provides a pneumatic tire that can provide performance on snow and performance on ice in a compatible manner.

A pneumatic tire includes two circumferential main grooves disposed in a region on one side of a tire equatorial plane as a boundary; and a land portion defined by the two circumferential main grooves, the land portion including a circumferential narrow groove extending in a tire circumferential direction and a plurality of sets of a first lug groove and a second lug groove that extend in a tire lateral direction through the circumferential narrow groove; the first lug groove including an end portion that opens to an edge portion on one side of the land portion and another end portion that terminates within the land portion, the second lug groove including an end portion that opens to another edge portion of the land portion and another end portion that terminates within the land portion; and the first lug groove and the second lug groove being alternately disposed in the tire circumferential direction.

In a pneumatic tire according to an embodiment of the technology, the first lug groove and the second lug groove extend in the tire lateral direction through the circumferential narrow groove and each of the lug grooves opens to the circumferential main grooves. Thus, the number of groove intersection portions is increased, groove volume is increased, and the shear force in snow and snow discharge properties of the land portion on snow-covered road surfaces are improved. Additionally, the first lug groove and the second lug groove include another end that terminates within the land portion. Thus, the ground contact area of the land portion is ensured, and adhesion and friction forces on icy road surfaces are ensured. This is advantageous in that the performance on snow and the performance on ice of the tire are achieved in a compatible manner.

BRIEF DESCRIPTION OF DRAWINGS

FIG. 6 is a table showing the results of performance tests of pneumatic tires according to embodiments of the technology.

DETAILED DESCRIPTION

Embodiments of the technology are described in detail below with reference to the drawings. However, the technology is not limited to these embodiments. Moreover, constituents of the embodiments include elements that are substitutable while maintaining consistency with the technology, and obviously substitutable elements. Furthermore, the modified examples described in the embodiments can be combined as desired within the scope apparent to one skilled in the art.

Pneumatic Tire

Figure 1:
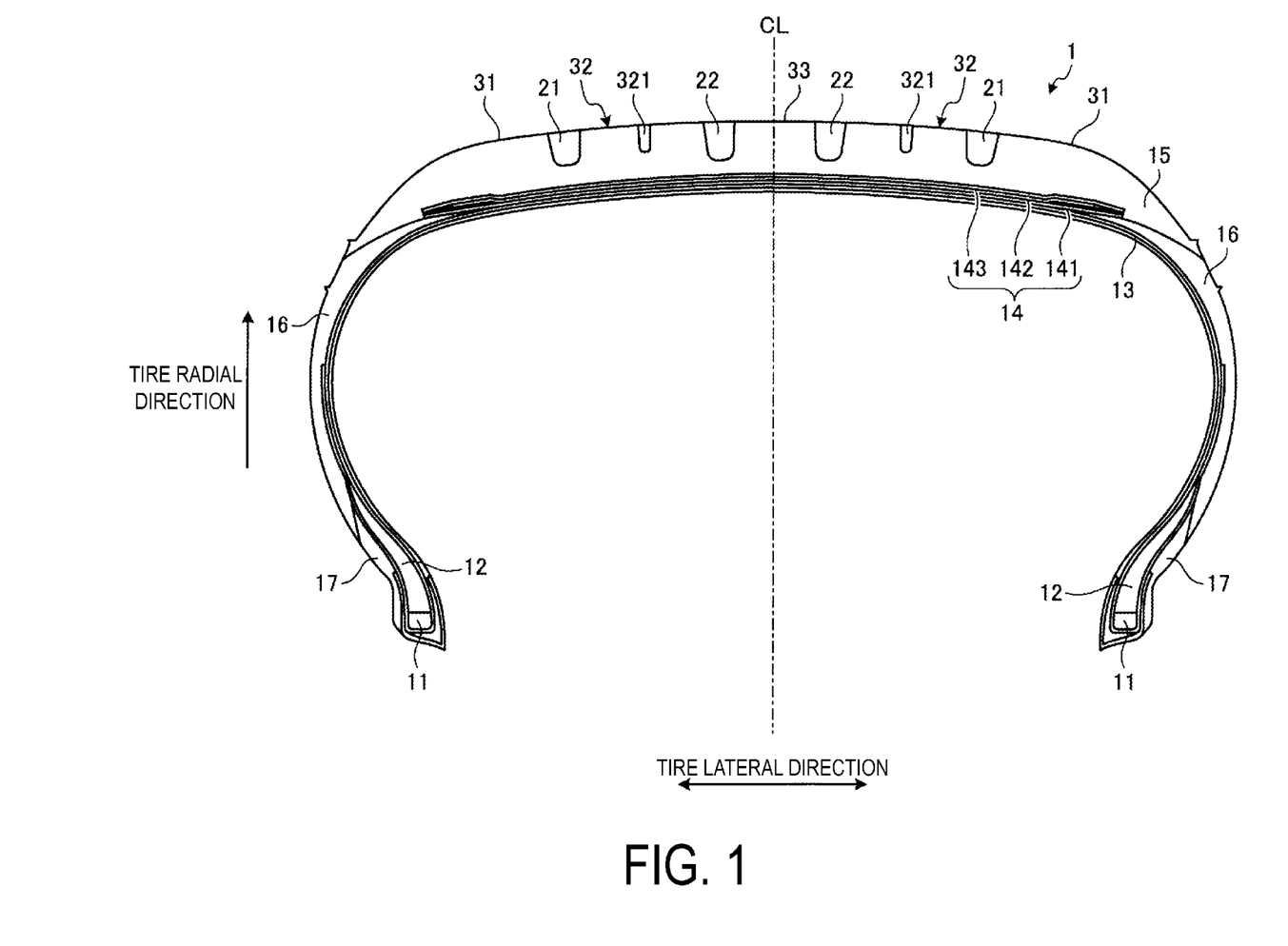
FIG. 1 is a cross-sectional view in a tire meridian direction illustrating a pneumatic tire according to an embodiment of the technology.

FIG. 1 is a cross-sectional view in a tire meridian direction illustrating a pneumatic tire according to an embodiment of the technology. FIG. 1 is a cross-sectional view of a half region in the tire radial direction. Also, FIG. 1 illustrates a radial tire for a passenger vehicle as an example of a pneumatic tire.

In reference to FIG. 1, "cross section in a tire meridian direction" refers to a cross section of the tire taken along a plane that includes the tire rotation axis (not illustrated). Reference sign CL denotes the tire equatorial plane and refers to a plane normal to the tire rotation axis that passes through the center point of the tire in the tire rotation axis direction. "Tire lateral direction" refers to the direction parallel with the tire rotation axis. "Tire radial direction" refers to the direction vertical to the tire rotation axis.

A pneumatic tire 1 has an annular structure with the tire rotation axis as its center and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 are annular members constituted by bead wires bundled together. The pair of bead cores 11, 11 constitute the cores of the left and right bead portions. The pair of bead fillers 12, 12 are disposed outward of the pair of bead cores 11, 11 in the tire radial direction and constitute the bead portions.

The carcass layer 13 has a single layer structure made of one carcass ply or a multilayer structure made of carcass plies, and extends between the left and right bead cores 11, 11 in a toroidal shape, forming the framework of the tire. Additionally, both end portions of the carcass layer 13 are turned back outwardly in the tire lateral direction so as to wrap around the bead cores 11 and the bead fillers 12 and fixed. The carcass ply (plies) of the carcass layer 13 is made by performing a process of covering carcass cords made of steel or an organic fiber material (e.g. aramid, nylon, polyester, rayon, or the like) with coating rubber and then a rolling process. The carcass ply (plies) has a carcass angle (defined as the longitudinal inclination angle of the carcass cords with respect to the tire circumferential direction), as an absolute value, from 80 degrees to 95 degrees.

The belt layer 14 is a multilayer structure including a pair of cross belts 141, 142 and a belt cover 143 and is disposed around the outer circumference of the carcass layer 13. The pair of cross belts 141, 142 are made by performing a process of covering belt cords made of steel or an organic fiber material with coating rubber and then a rolling process. The cross belts 141, 142 have a belt angle, as an absolute value, from 20 degrees to 55 degrees. Furthermore, the pair of cross belts 141, 142 have belt angles (defined as the longitudinal inclination angle of the belt cords with respect to the tire circumferential direction) of opposite signs, and the belts are layered so that the longitudinal directions of the belt cords intersect each other (i.e. crossply structure). Additionally, the belt cover 143 is made by coating belt cords made of steel or an organic fiber material with coating rubber. The belt cover 143 has a belt angle, as an absolute value, from 0 degrees to 10 degrees. Furthermore, the belt cover 143, for example, is a strip material made by covering a belt cord or belt cords with coating rubber. The strip material is spirally wound around the outer circumferential surface of the cross belts 141, 142 a number of times in the tire circumferential direction.

The tread rubber 15 is disposed outward of the carcass layer 13 and the belt layer 14 in the tire radial direction and constitutes a tread portion. The pair of sidewall rubbers 16, 16 are disposed outward of the carcass layer 13 in the tire lateral direction and constitute left and right sidewall portions. The pair of rim cushion rubbers 17, 17 are disposed inward of the left and right bead cores 11, 11 and the turned back portions of the carcass layer 13 in the tire radial direction. The pair of rim cushion rubbers 17, 17 constitute the contact surfaces of the left and right bead portions with the rim flanges.

Tread Pattern

Figure 2:
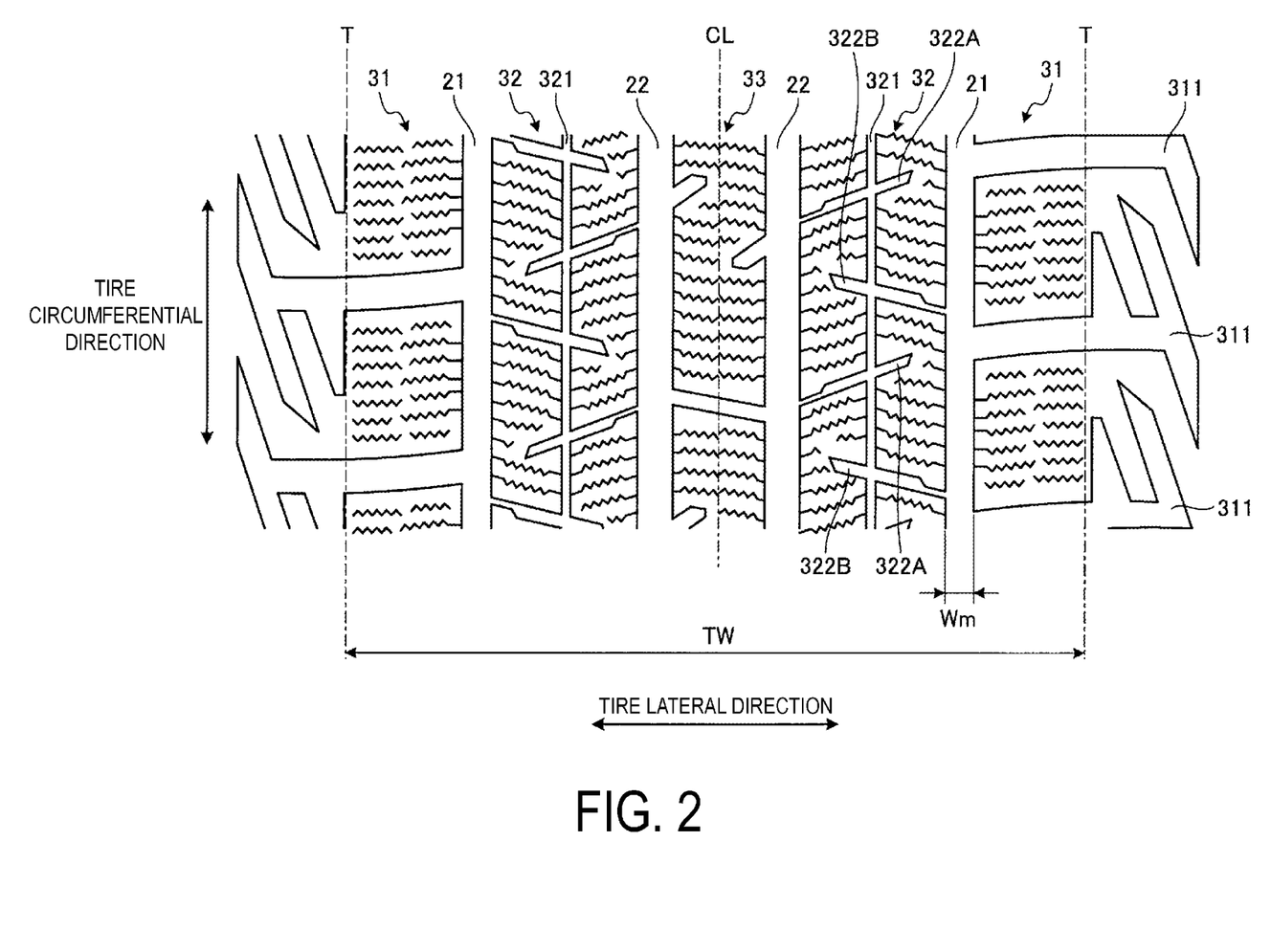
FIG. 2 is a plan view illustrating a tread surface of the pneumatic tire illustrated in FIG. 1.

FIG. 2 is a plan view illustrating a tread surface of the pneumatic tire illustrated in FIG. 1. FIG. 2 illustrates a tread pattern of a studless tire. In reference to FIG. 2, "tire circumferential direction" refers to the direction revolving about the tire rotation axis. Reference sign T denotes a tire ground contact edge.

As illustrated in FIG. 2, the pneumatic tire 1 is provided with, in the tread surface, circumferential main grooves 21, 22 extending in the tire circumferential direction, land portions 31 to 33 defined by the circumferential main grooves 21, 22, and lug grooves 311, 322A, 322B disposed in the land portions 31 to 33.

"Main groove" refers to a groove that is required to have a wear indicator as stipulated by JATMA (Japan Automobile Tyre Manufacturers Association Inc.) and typically has a groove width of 5.0 mm or greater and a groove depth of 6.5 mm or greater. "Lug groove" refers to a lateral groove extending in the tire lateral direction that typically has a groove width of 1.0 mm or greater and a groove depth of 3.0 mm or greater. "Sipe" (referred to below) refers to a cut formed in a tread contact surface that typically has a sipe width of less than 1.0 mm and a sipe depth of 2.0 mm or greater and closes when the tire comes into contact with the ground.

The groove width is the maximum distance between the left and right groove walls at the groove opening portion and is measured when the tire is mounted on a specified rim, inflated to the specified internal pressure, and in an unloaded state. In configurations in which the land portions include notch portions or chamfered portions on the edge portions thereof, the groove width is measured with reference to the intersection points where the tread contact surface and extension lines of the groove walls meet, when viewed in a cross-section normal to the groove length direction. Additionally, in configuration in which the grooves extend in a zigzag-like or wave-like manner in the tire circumferential direction, the groove width is measured with reference to the center line of the amplitude of the groove walls.

The groove depth is the maximum distance from the tread contact surface to the groove bottom and is measured when the tire is mounted on a specified rim, inflated to the specified internal pressure, and in an unloaded state. Additionally, in configurations in which the grooves include an uneven portion or sipes on the groove bottom, the groove depth is measured excluding these portions.

The sipe width is the maximum distance of the opening width of the sipe at the road contact surface of the land portion and is measured when the tire is mounted on a specified rim, inflated to the specified internal pressure, and in an unloaded state.

The sipe depth is the maximum distance from the tread contact surface to the sipe bottom and is measured when the tire is mounted on a specified rim, inflated to the specified internal pressure, and in an unloaded state. Additionally, in configurations in which the sipes include an uneven portion on the groove bottom, the sipe depth is measured excluding these portions.

"Specified rim" refers to an "applicable rim" defined by JATMA, a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, and to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in the case of JATMA, for a passenger vehicle tire, the specified internal pressure is an air pressure of 180 kPa, and the specified load is 88% of the maximum load capacity.

For example, in the configuration of FIG. 2, the pneumatic tire 1 has a tread pattern being substantially point symmetrical to a point on a tire equatorial plane CL. However, no such limitation is intended, and, for example, the pneumatic tire 1 may include a tread pattern with left-right symmetry or left-right asymmetry centered on the tire equatorial plane CL, or a tread pattern with directionality in the tire rotation direction (not illustrated).

In the configuration of FIG. 2, two circumferential main grooves 21, 22 are disposed in each left and right region on either side of the tire equatorial plane CL as a boundary. The circumferential main grooves 21, 22 are disposed having left-right symmetry centered on the tire equatorial plane CL. Five land portions 31 to 33 are defined by the circumferential main grooves 21, 22. One land portion 33 is disposed on the tire equatorial plane CL.

However, no such limitation is intended, and three or five or more circumferential main grooves may be provided, or the circumferential main grooves may be disposed with left-right asymmetry centered on the tire equatorial plane CL (not illustrated). The land portion may be disposed at a position away from the tire equatorial plane CL by disposing one circumferential main groove on the tire equatorial plane CL (not illustrated).

Additionally, in the region on either side of the tire equatorial plane CL as a boundary, the left and right circumferential main grooves 21, 21 located outermost in the tire lateral direction are defined as outermost circumferential main grooves. Typically, the distance (dimension symbol omitted in drawings) from the tire equatorial plane CL to the outermost circumferential main groove 21 ranges from 20% to 35% of a tire ground contact width TW.

Tire ground contact width TW is the maximum linear distance in the tire axial direction of a contact surface between the tire and a flat plate measured when the tire is mounted on a specified rim, inflated to the specified internal pressure, placed vertically on the flat plate in a static state, and loaded with a load corresponding to the specified load.

Tire ground contact edge T is defined as the maximum width position in the tire axial direction of the contact surface between the tire and a flat plate when the tire is mounted on a specified rim, inflated to the specified internal pressure, placed vertically on the flat plate in a static state, and loaded with a load corresponding to the specified load.

The land portion 31 located outermost in the tire lateral direction among the land portions 31 to 33 defined by the circumferential main grooves 21, 22 is defined as a shoulder land portion. The shoulder land portion 31 is an outer land portion in the tire lateral direction defined by the outermost circumferential main groove 21 and includes the tire ground contact edge T on its road contact surface. Additionally, the land portion 32 second from the outer side in the tire lateral direction is defined as a second land portion. The second land portion 32 is an inner land portion in the tire lateral direction defined by the outermost circumferential main groove 21 and is located adjacent to the shoulder land portion 31 interposing the outermost circumferential main groove 21. Furthermore, the land portion 33 disposed closer to the tire equatorial plane CL than the second land portion 32 is defined as a center land portion. The center land portion 33 may be disposed on the tire equatorial plane CL (FIG. 2) or disposed away from the tire equatorial plane CL (not illustrated).

Note that in the configuration of FIG. 2, only one center land portion 33 is provided. However, in a configuration with five or more circumferential main grooves, a plurality of center land portions may be defined (not illustrated). Additionally, in a configuration with three circumferential main grooves, the center land portion may also be the second land portion (not illustrated).

In the configuration of FIG. 2, all of the circumferential main grooves 21, 22 have a straight shape. However, no such limitation is intended, and at least one or all of the circumferential main grooves 21, 22 may have a zigzag shape, a wave-like shape, or a step-like shape with amplitude in the tire lateral direction (not illustrated).

Block Row of Second Land Portion

In developing a studless tire, providing performance on snow and performance on ice in a compatible manner has recently become even more important. In particular, there are many demands for improvement of performance on ice in terms of braking ability, turnability, and the like. Typically, reducing the groove area of the tread pattern is effective in improving performance on ice. However, increasing the groove area of the tread pattern is effective in improving performance on snow. Thus, providing performance on snow and performance on ice in a compatible manner has proved difficult.

The pneumatic tire 1 employs the following configuration to provide performance on snow and performance on ice in a compatible manner.

Figure 3:
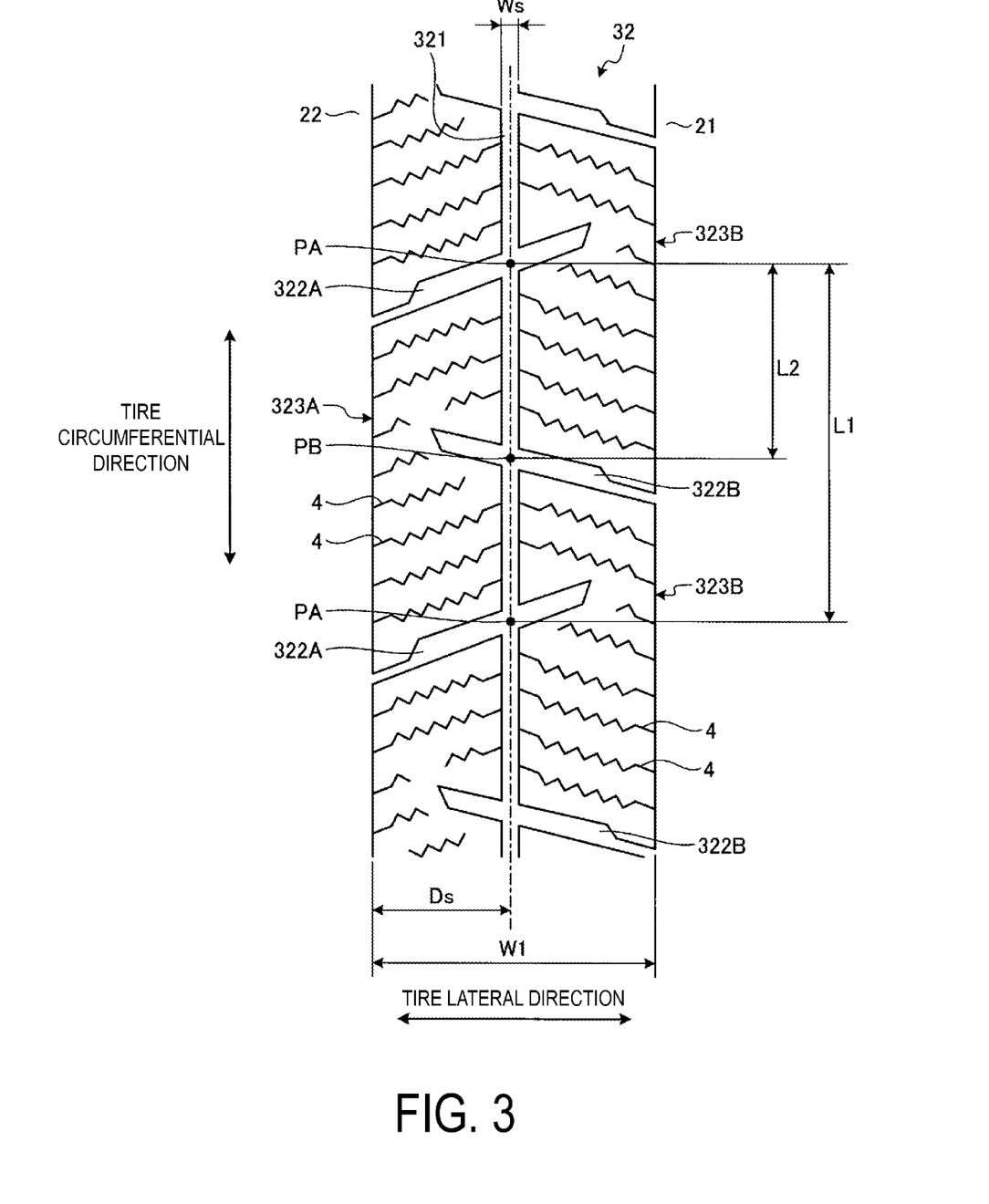
FIG. 3 is a plan view illustrating one land portion of the tread pattern illustrated in FIG. 2.
Figure 4:
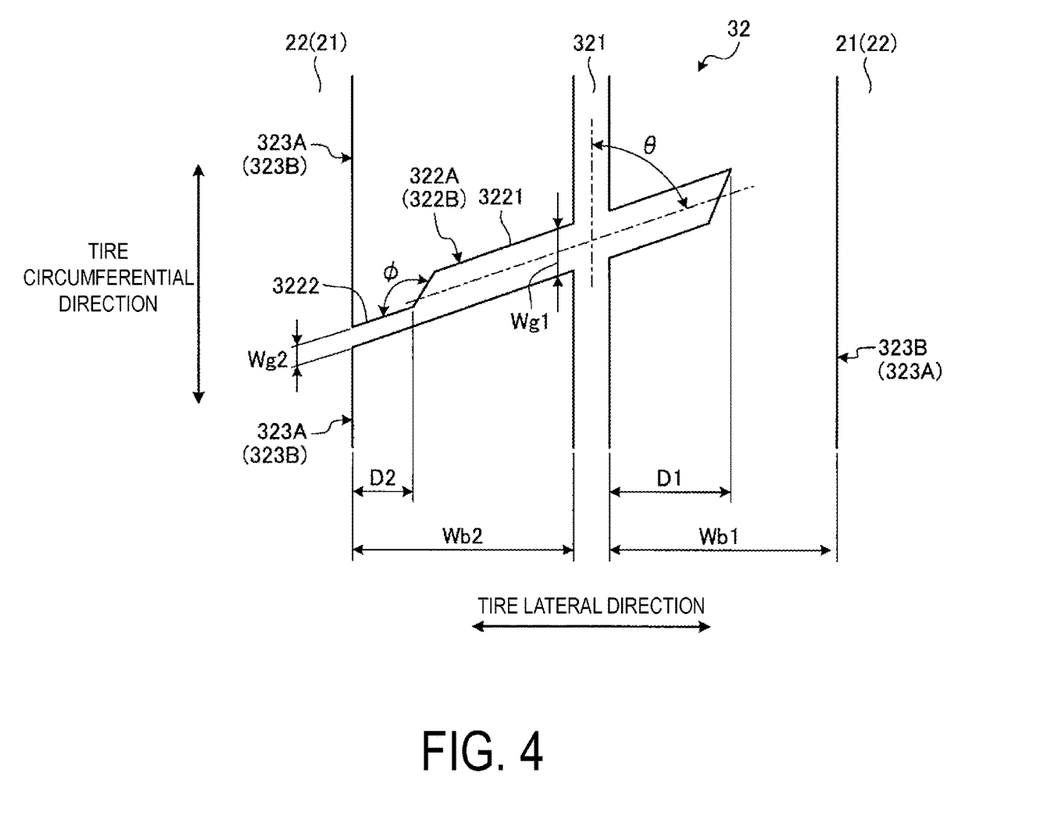
FIG. 4 is an explanatory diagram illustrating a lug groove of the land portion illustrated in FIG. 3.

FIG. 3 is a plan view illustrating one land portion of the tread pattern illustrated in FIG. 2. FIG. 4 is an explanatory diagram illustrating a lug groove of the land portion illustrated in FIG. 3. Of these drawings, FIG. 3 is an enlarged plan view of the second land portion 32, and FIG. 4 is an extracted and simplified view of the shape of the lug groove 322 (322A, 322B) disposed in the second land portion 32.

As illustrated in FIG. 3, the second land portion 32 includes a single circumferential narrow groove 321, and two kinds of plurality of lug grooves 322A, 322B.

The circumferential narrow groove 321 is a narrow groove extending in the tire circumferential direction and is disposed in a central portion of the land portion 32 in the width direction. Specifically, a groove width Ws of the circumferential narrow groove 321 preferably has the relationship with a groove width Wm of the outermost circumferential main groove 21 satisfying $0.20 \leq Ws/Wm \leq 0.50$. Of the left and right regions on either side of the tire equatorial plane CL as a boundary, the circumferential narrow groove 321 and the outermost circumferential main groove 21 disposed in the same region are the subjects of comparison. Additionally, a distance Ds from one edge portion on one side of the land portion 32 to the groove center line of the circumferential narrow groove 321 and a width W1 of the land portion 32 preferably have the relationship $0.35 \leq Ds/W1 \leq 0.65$, and more preferably have the relationship $0.40 \leq Ds/W1 \leq 0.55$. In this way, the rigidity of the left and right regions of the land portion 32 divided by the circumferential narrow groove 321 is made uniform.

The distance Ds is measured as the distance in the tire axial direction from a measurement point of the groove width of the circumferential main grooves 21, 22 to the groove center line of the circumferential narrow groove 321, when the tire is mounted on a specified rim, inflated to the specified internal pressure, and in an unloaded state. The width W1 of the land portion 32 is measured using the measurement points of the groove width of the left and right circumferential main grooves 21, 22 as a reference.

In a typical tire for a passenger vehicle, the width W1 of the second land portion 32 and the tire ground contact width TW (see FIG. 2) have the range $0.10 \leq W1/TW \leq 0.30$.

For example, in the configuration of FIG. 3, the circumferential narrow groove 321 has a straight shape. However, no such limitation is intended, and the circumferential narrow groove 321 may have a zigzag shape, a wave-like shape, or a step-like shape with amplitude in the tire lateral direction. In this way, the edge components of the land portion 32 increase and performance on snow and performance on ice are improved. Additionally, the groove depth of the circumferential narrow groove 321 is shallower than the groove depth of the circumferential main grooves 21, 22 on the left and right of the land portion 32. Thus, the rigidity of the land portion 32 is ensured.

The two kinds of lug grooves 322A, 322B are lateral grooves extending in the tire lateral direction through the circumferential narrow groove 321. They are classified as first lug groove 322A and second lug groove 322B. Specifically, the first lug groove 322A includes an end portion that opens to the edge portion on one side (left side in FIG. 3) of the land portion 32 and an end portion that terminates within the land portion 32. The second lug groove 322B includes an end portion that opens to the edge portion on the other side (right side in FIG. 3) of the land portion 32 and an end portion that terminates within the land portion 32. Thus, the first lug groove 322A and the second lug groove 322B have a semi-closed structure that does not traverse the land portion 32. Also, the first lug groove 322A and the second lug groove 322B open into different circumferential main grooves 21, 22.

In such a configuration, the first lug groove 322A and the second lug groove 322B extend in the tire lateral direction through the circumferential narrow groove 321 and open into the circumferential main grooves 21, 22. Thus, groove volume is increased, and the shear force in snow and the snow discharge properties of the land portion 32 on snow-covered road surfaces is improved. Additionally, the first lug groove 322A and the second lug groove 322B include an end portion that terminates within the land portion 32. Thus, the ground contact area of the land portion 32 is ensured, and adhesion and friction forces on icy road surfaces are ensured. In this way, the performance on snow and the performance on ice of the tire are achieved in a compatible manner.

Additionally, the first lug groove 322A and the second lug groove 322B are alternately disposed separated from one another by a predetermined interval in the tire circumferential direction. Thus, the first lug groove 322A and the second lug groove 322B alternate from left to right in opening to the left and right circumferential main grooves 21, 22 and alternate from left to right in meeting the circumferential narrow groove 321. In this way, many intersection portions of the first lug groove 322A and the second lug groove 322B with the circumferential main grooves 21, 22 and the circumferential narrow groove 321 are ensured. This allows the shear force in snow and the snow discharge properties of the land portion 32 on snow-covered road surfaces to be improved. Additionally, the opening portions of the first lug groove 322A and the second lug groove 322B are alternately disposed from left to right with respect to the left and right edge portions of the land portion 32. This allows the shear force in snow and edge effect of the lug grooves 322A, 322B when the vehicle is turning to be improved compared to a configuration in which the plurality of lug grooves only open into the edge portion on one side (not illustrated).

Intersection points of the groove center lines of the first lug groove 322A and the second lug groove 322B with the groove center line of the circumferential narrow groove 321 are defined as intersection points PA, PB. In this configuration, a distance L1 in the tire circumferential direction between the intersection points PA, PA of an adjacent pair of the first lug grooves 322A, 322A and a distance L2 from the intersection point PA of the first lug groove 322A to the intersection point PB of the second lug groove 322B preferably have the relationship $0.35 \leq L2/L1 \leq 0.65$ and more preferably have the relationship $0.40 \leq L2/L1 \leq 0.60$. This allows the arrangement interval between the lug grooves 322A, 322B in the land portion 32 to be made uniform, and the rigidity of the region defined by adjacent lug grooves 322A, 322B in the tire circumferential direction to be made uniform.

For example, in the configuration of FIG. 3, the second land portion 32 is defined by left and right circumferential main grooves 21, 22, the circumferential narrow groove 321, and two kinds of lug grooves 322A, 322B to form blocks 323A, 323B. Additionally, the first lug groove 322A and the second lug groove 322B alternately open in the tire circumferential direction to the left and right circumferential main grooves 21, 22 and the circumferential narrow groove 321. Accordingly, the blocks 323A, 323B are arranged in a staggered manner around the entire circumference of the tire. This allows block rigidity to be made uniform and the amount of groove edge to be maximized, greatly improving performance on ice.

Additionally, the first lug groove 322A and the second lug groove 322B have a structure with line symmetry with one another and are inclined with the same inclination angle in opposite direction with respect to the tire circumferential direction. Thus, the blocks 323A, 323B located on the left and right of the circumferential narrow groove 321 have a same road contact surface with a parallelogram shape. In this way, the ground contact shapes of the blocks 323A, 323B are made uniform. Additionally, the first lug groove 322A and the second lug groove 322B have a groove depth which is shallower than the groove depth of the circumferential main grooves 21, 22. Thus, the rigidity of the land portion 32 is ensured.

Adjacent blocks 323A, 323A; 323A, 323B; 323B, 323B have a ground contact area ratio preferably ranging from 0.80 to 1.20 and more preferably ranging from 0.90 to 1.10. In this way, the ground contact area of adjacent blocks is made uniform.

The ground contact area of the block is measured at a contact surface between a tire and a flat plate when the tire is mounted on a specified rim, inflated to the specified internal pressure, placed vertically on the flat plate in a static state, and loaded with a load corresponding to the specified load.

As illustrated in FIG. 4, an inclination angle θ of the lug groove 322A (322B) with respect to the tire circumferential direction is preferably in the range 40 degrees $\leq \theta \leq 85$ degrees and more preferably in the range 60 degrees$\leq \theta \leq 75$ degrees. In this way, the inclination angle θ of the lug groove 322A (322B) is made appropriate.

The inclination angle θ of the lug groove is measured as the angle between the groove center line of the lug groove and the tire circumferential direction.

Additionally, a groove width Wg1 of the lug groove 322A (322B) at the meeting position with the circumferential narrow groove 321 and a groove width Wg2 of the lug groove 322A (322B) at the edge portion of the land portion 32 have the relationship Wg2<Wg1. Moreover, the Wg1/Wg2 ratio is preferably in the range $0.20 \leq Wg2/Wg1 \leq 0.70$. In this configuration, by narrowing the groove width of the lug groove 322A (322B) at the edge portion of the land portion 32, the rigidity of the edge portion of the second land portion 32 is appropriately ensured.

The maximum groove width (groove width Wg1 in FIG. 4) of the lug grooves 322A, 322B of the second land portion 32 preferably ranges from 25% to 60% of the groove width Wm (see FIG. 2) of the outermost circumferential main groove 21 and more preferably ranges from 30% to 50%. Accordingly, the lug grooves 322A, 322B of the second land portion 32 have a narrower groove width than a general lug groove. In this way, the number of lug grooves 322A, 322B and edge components are ensured. Also, the narrowed groove width of the lug grooves 322A, 322B ensures a sufficient ground contact area.

For example, in the configuration of FIG. 4, the lug groove 322A (322B) has a step-like shape with a narrowed groove width at the opening portion to the circumferential main groove 21, 22. Specifically, the lug groove 322A (322B) includes a broad width portion 3221 and a narrow width portion 3222 that connect in a straight line. The broad width portion 3221 extends through the circumferential narrow groove 321 and terminates within the land portion 32. The narrow width portion 3222 opens into the circumferential main groove 21, 22. Additionally, the edge portion on one side (lower side in FIG. 4) of the lug groove 322A (322B) has a linear shape. The edge portion on the other side (upper side in FIG. 4) has a step-like shape. An inclination angle θ of the step-up portion of the step-like shape is an obtuse angle. The broad width portion 3221 and the narrow width portion 3222 have constant groove widths. The broad width portion 3221 is shaped overall like a parallelogram.

In the configuration of FIG. 4, the groove width Wg2 of the narrow width portion 3222 has the range 1 mm≤Wg2. The narrow width portion 3222 is set to not close when the tire comes into contact with the ground. This allows the edge components of the lug groove 322A (322B) when the tire comes into contact with the ground to be appropriately ensured. However, the narrow width portion 3222 may have a groove width similar to that of the sipes and may close when the tire comes into contact with the ground. This allows the rigidity of the edge portions of the second land portion 32 when the tire comes into contact with the ground to be increased.

In the land portion 32, an extension distance D2 in the tire lateral direction of the narrow width portion 3222 of the lug groove 322A (322B) and a width Wb2 of the block 323A (323B) including the narrow width portion 3222 preferably have the relationship $0.20 \leq D2/Wb2 \leq 0.50$ and more preferably have the relationship $0.30 \leq D2/Wb2 \leq 0.40$. This allows the extension distance D2 of the narrow width portion 3222 to be appropriately set.

A distance D1 from the edge portion of the block 323B (323A) defined by the circumferential narrow groove 321 to the terminating end portion of the lug groove 322A (322B) and a width Wb1 of the block 323B (323A) preferably have the relationship $0.30 \leq D1/Wb1 \leq 0.70$ and more preferably have the relationship $0.40 \leq D1/Wb1 \leq 0.60$. In this way, the position of the terminating end portion of the lug groove 322A (322B) is made appropriate.

Note that in the configuration of FIG. 3, the lug grooves 322A, 322B have a straight shape overall. However, no such limitation is intended, and the lug grooves 322A, 322B may have an arc shape, an S-shape, a bent shape, or the like (not illustrated).

Additionally, as illustrated in FIG. 2, in relationship to the shoulder land portion 31, a total number N1 of the lug grooves 322A, 322B disposed in the second land portion 32 and a total number Nsh of the lug grooves 311 disposed in the shoulder land portions 31 preferably have the relationship $1.2 \leq N1/Nsh \leq 3.5$ and more preferably have the relationship $1.5 \leq N1/Nsh \leq 2.5$. The edge components formed on the second land portion 32 contribute greatly to performance on ice. In this way, as described above, by densely arranging the lug grooves 322A, 322B in the second land portion 32, the edge components of the second land portion 32 can be increased and an effect of improving performance on ice can be efficiently obtained. Also, by sparsely arranging the lug grooves 311 in the shoulder land portions 31, the rigidity of the shoulder land portion 31 can be ensured.

For example, in the configuration of FIG. 2, the shoulder land portion 31 and the second land portion 32 have the same pitch number. In the shoulder land portion 31, one lug groove 311 is disposed for each pitch. In the second land portion 32, a set of lug grooves 322A, 322B is disposed for each pitch. Additionally, the groove width (the maximum groove width Wg1 in FIG. 4) of the lug grooves 322A, 322B disposed in the second land portion 32 is less than the groove width (dimension symbol omitted in drawings) of the lug groove 311 disposed in the shoulder land portion 31. Specifically, the groove width of the lug grooves 322A, 322B of the second land portion 32 preferably ranges from 15% to 60% of the groove width of the lug groove 311 of the shoulder land portion 31 and more preferably ranges from 20% to 50%. In this way, the total number N1 of the lug grooves 322A, 322B is large and the edge components of the second land portion 32 are increased, but the groove width of the lug grooves 322A, 322B is narrow to ensure sufficient ground contact area for the second land portion 32. Furthermore, the groove area ratio of the shoulder land portion 31 and the groove area ratio of the second land portion 32 are made uniform.

Note that in the configuration of FIG. 2, as described above, the shoulder land portion 31 and the second land portion 32 have the same pitch number. However, no such limitation is intended, and the land portions 31, 32 may have different pitch numbers. In such a configuration, the pitch number of the second land portion 32 is preferably greater than the pitch number of the shoulder land portion 31. This allows an effect of improving performance on ice to be efficiently obtained and the rigidity of the shoulder land portions 31 to be appropriately ensured.

In the configuration of FIG. 2, the land portions 31 to 33 includes a plurality of sipes (dimension symbol omitted in drawings). As illustrated in FIG. 3, the second land portion 32 includes a plurality of sipes 4 in the road contact surface of the blocks 323A, 323B on the left and right of the circumferential narrow groove 321 as a boundary. Additionally, the inclination direction of the sipes 4 disposed in the blocks 323A on one side of the circumferential narrow groove 321 as a boundary is different from the inclination direction of the sipes 4 disposed in the blocks 323B on the other side. Specifically, in the blocks 323A on the left side of FIG. 3, the sipes 4 are disposed parallel with the first lug grooves 322A and are inclined upward to the right in the drawings, mimicking the first lug grooves 322A. In a similar manner, in the blocks 323B on the right side of FIG. 3, the sipes 4 are disposed parallel with the second lug grooves 322B and are inclined downward to the right, mimicking the second lug groove 322B. In this way, the edge effect of the sipes 4 when the vehicle is turning can be increased.

Modified Examples

Figure 5:
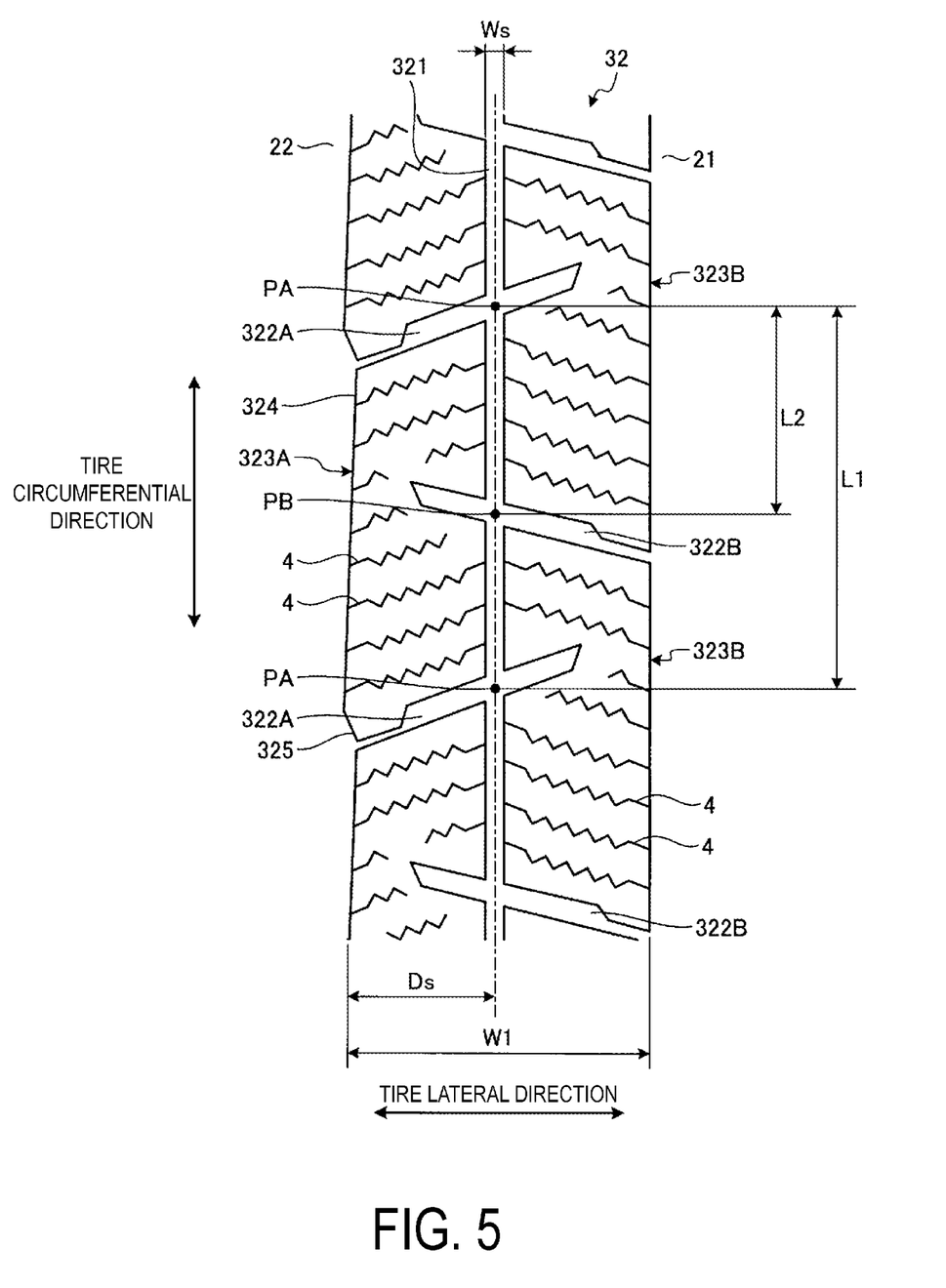
FIG. 5 is an explanatory diagram illustrating a modified example of the pneumatic tire illustrated in FIG. 1.

FIG. 5 is an explanatory diagram of a modified example of the pneumatic tire illustrated in FIG. 1. FIG. 5 is an enlarged plan view of the second land portion 32.

In the configuration of FIG. 2, the left and right circumferential main grooves 21, 22 defining the second land portion 32 have a straight shape, and the left and right edge portions of the second land portion 32 have a straight shape.

However, no such limitation is intended, and at least one or both of the circumferential main grooves 21, 22 defining the second land portion 32 may have a zigzag shape, a wave-like shape, or a step-like shape with amplitude in the tire lateral direction. Additionally, at least one or both of the edge portions of the second land portion 32 may have a zigzag shape, a wave-like shape, or a step-like shape with amplitude in the tire lateral direction. Furthermore, the shape of the circumferential main grooves 21, 22 may not match the shape of the edge portions of the second land portion 32.

For example, in the configuration of FIG. 5, the left and right circumferential main grooves 21, 22 defining the second land portion 32 have a straight shape around the entire circumference of the tire. Additionally, the edge portion of the second land portion 32 on the side closer to the tire equatorial plane CL (see FIG. 2) has a zigzag shape with amplitude in the tire equatorial plane around the entire circumference of the tire. Specifically, one block 323A defined by the circumferential narrow groove 321 and a pair of the lug grooves 322A, 322A include a pair of chamfered portions 324, 325 on the edge portion on the side closer to the circumferential main groove 22. The first chamfered portion 324 has an elongated structure and extends roughly from an opening portion of one of the lug grooves 322A near to an adjacent opening portion of the other lug grooves 322A in the tire circumferential direction. The width of the first chamfered portion 324 is greatest at the opening portion of one of the lug grooves 322A and decreases towards the opening portion of the other lug groove 322A. Additionally, the second chamfered portion 325 has a short structure and is formed at the opening portion of the other lug groove 322A. In this way, the blocks 323A of the second land portion 32 include the pair of chamfered portions 324, 325 at the edge portion on the side closer to the circumferential main groove 22. This gives the edge portion of the second land portion 32 on the side closer to the tire equatorial plane of the road contact surface a zigzag shape overall.

Effects

As described above, the pneumatic tire 1 includes two circumferential main grooves 21, 22 disposed in the region on one side of the tire equatorial plane CL as a boundary and a land portion 32 defined by the circumferential main grooves 21, 22 (see FIG. 2). The land portion 32 includes the circumferential narrow groove 321 extending in the tire circumferential direction and sets of the first lug groove 322A and the second lug groove 322B extending the tire lateral direction through the circumferential narrow groove 321 (see FIG. 3). The first lug groove 322A includes an end portion that opens to the edge portion on one side of the land portion 32 and another end portion that terminates within the land portion 32. The second lug groove 322B includes an end portion that opens to the edge portion on the other side of the land portion 32 and another end portion that terminates within the land portion 32. Additionally, the first lug groove 322A and the second lug groove 322B are alternately disposed in the tire circumferential direction.

In such a configuration, the first lug groove 322A and the second lug groove 322B extend in the tire lateral direction through the circumferential narrow groove 321 and open into the circumferential main grooves 21, 22. Thus, the number of groove intersection portions is increased, groove volume is increased, and the shear force in snow and snow discharge properties of the land portion 32 on snow-covered road surfaces is improved. Additionally, the first lug groove 322A and the second lug groove 322B include an end that terminates within the land portion 32. Thus, the ground contact area of the land portion 32 is ensured, and adhesion and friction forces on icy road surfaces are ensured. This is advantageous in that the performance on snow and the performance on ice of the tire are achieved in a compatible manner.

Additionally, the first lug groove 322A and the second lug groove 322B are alternately disposed in the tire circumferential direction. Thus, the first lug groove 322A and the second lug groove 322B alternately open into the left and right edge portions of the land portion 32. This allows the edge effect of the lug grooves 322A, 322B when the vehicle is turning to be improved compared to a configuration in which the lug grooves only open into the edge portion on one side (not illustrated). This is advantageous in that the turning performance of the tire on icy road surfaces in particular is improved.

Additionally, in the pneumatic tire 1, the land portion 32 includes blocks 323A, 323B defined by two circumferential main grooves 21, 22, the circumferential narrow groove 321, and the plurality of sets of the first lug groove 322A and the second lug groove 322B (see FIG. 3). The blocks 323A, 323B are arranged in a staggered manner around the entire circumference of the tire. In such a configuration, by the blocks 323A, 323B being arranged in a staggered manner around the entire circumference of the tire, block rigidity can be made uniform and the amount of groove edge can be maximized. This is advantageous in that the performance on ice of the tire is greatly improved.

In the pneumatic tire 1, adjacent blocks 323A, 323A; 323A, 323B; 323B, 323B have a ground contact area ratio ranging from 0.80 to 1.20 (see FIG. 3). This is advantageous in that the ground contact area of adjacent blocks is made uniform and uneven wear of the blocks is suppressed.

Additionally, in the pneumatic tire 1, the first lug groove 322A and the second lug groove 322B are inclined in opposite directions with respect to the tire circumferential direction (see FIG. 3). In such a configuration, the edge effect of the lug grooves 322A, 322B when the vehicle is turning is improved compared to a configuration in which all of the lug grooves in the land portion are inclined in the same direction (not illustrated). This is advantageous in that the turning performance of the tire on icy road surfaces in particular is improved.

Additionally, in the pneumatic tire 1, the inclination angle $\theta$ of the first lug groove 322A and the second lug groove 322B with respect to the tire circumferential direction is in the range 40 degrees $\leq \theta \leq$ 85 degrees (see FIG. 4). This is advantageous in that the inclination angle $\theta$ of the lug grooves 322A, 322B is made appropriate. In other words, by satisfying 40 degrees $\leq \theta$, the inclination angle $\theta$ is appropriately ensured and the traction characteristics attributable to the lug grooves 322A, 322B are ensured. Additionally, by satisfying $\theta \leq 85$ degrees, an effect of improving turning performance on ice attributable to the inclination of the lug grooves 322A, 322B can be appropriately obtained.

In the pneumatic tire 1, the groove width Wg1 of the first lug groove 322A and the second lug groove 322B at the meeting positions with the circumferential narrow groove 321 and the groove width Wg2 of the first lug groove 322A and the second lug groove 322B at the edge portions of the land portion 32 have the relationship Wg2<Wg1 (see FIG. 4). By narrowing the groove width of the lug groove 322A (322B) at the edge portion of the land portion 32, the rigidity of the edge portion of the second land portion 32 is appropriately ensured. Thus, the performance on ice of the tire is ensured.

In the pneumatic tire 1, the first lug groove 322A and the second lug groove 322B have a step-like shape, with the groove width narrowed at the opening portions to the circumferential main grooves 21, 22 (see FIG. 4). This is advantageous in that the rigidity of the edge portions of the second land portion 32 is effectively ensured.

Additionally, in the pneumatic tire 1, the land portion 32 includes blocks 323A, 323B defined by two circumferential main grooves 21, 22, the circumferential narrow groove 321, and the plurality of sets of the first lug groove 322A and the second lug groove 322B (see FIG. 3). The extension distance D2 in the tire lateral direction of the narrow width portion 3222 of the step-like shape of the first lug groove 322A and the second lug groove 322B and the width Wb2 of the blocks 323A, 323B including the narrow width portion 3222 have the relationship 0.20$\leq$D2/Wb2$\leq$0.50 (see FIG. 4). This is advantageous in that the extension distance D2 of the narrow width portion 3222 is appropriately set. In other words, by satisfying 0.20$\leq$D2/Wb2, the groove volume of the lug grooves 322A, 322B is ensured and the shear force in snow effect attributable to the lug grooves 322A, 322B is ensured. Additionally, by satisfying D2/Wb2$\leq$0.50, the effect of reinforcing rigidity of the edge portion of the land portion 32 attributable to the narrow width portion 3222 is appropriately ensured.

In the pneumatic tire 1, the distance L1 in the tire circumferential direction between the intersection points PA, PA of an adjacent pair of the first lug grooves 322A, 322A, and the distance L2 from the intersection point PA of the first lug groove 322A to the intersection point PB of the second lug groove 322B have the relationship 0.35$\leq$L2/L1$\leq$0.65 (see FIG. 3), where the intersection points of the first lug groove 322A and the second lug groove 322B with the circumferential narrow groove 321 are defined as the intersection points PA, PB. This is advantageous in that the arrangement interval of the lug grooves 322A, 322B in the land portion 32 is made uniform, and the rigidity of the blocks 323A, 323B defined by the lug grooves 322A, 322B is made uniform.

Additionally, in the pneumatic tire 1, the land portion 32 includes blocks 323A, 323B defined by two circumferential main grooves 21, 22, the circumferential narrow groove 321, and the plurality of sets of the first lug groove 322A and the second lug groove 322B (see FIG. 3). The distance D1 from the edge portion of the blocks 323A, 323B to the terminating end portion of the lug groove 322A or the lug groove 322B and the width Wb1 of the blocks 323A, 323B have the relationship $0.30 \leq D1/Wb1 \leq 0.70$ (see FIG. 4). This is advantageous in that the position of the terminating end portion of the lug grooves 322A, 322B is made appropriate. In other words, by satisfying $0.30 \leq D1/Wb1$, the edge effect and the shear force in snow attributable to the lug grooves 322A, 322B can be ensured. Additionally, by satisfying $D1/Wb1 \leq 0.70$, the rigidity of the blocks 323A, 323B is ensured.

In the pneumatic tire 1, the circumferential narrow groove 321, the first lug groove 322A, and the second lug groove 322B have a groove depth which is shallower than the groove depth (not illustrated) of the circumferential main grooves 21, 22 (see FIG. 3). This is advantageous in that the rigidity of the land portion 32 is ensured and the performance on ice and the dry performance of the tire is ensured.

In the pneumatic tire 1, the total number N1 of the first lug groove 322A and the second lug groove 322B disposed in the second land portion 32 and the total number Nsh of the lug grooves 311 disposed in the shoulder land portions 31 have the relationship $1.2 \leq N1/Nsh \leq 3.5$ (see FIG. 2). This configuration is advantageous in that by densely arranging the lug grooves 322A, 322B in the second land portion 32, the edge components of the second land portion 32 can be increased and an effect of improving performance on ice can be efficiently obtained. This is also advantageous in that by sparsely arranging the lug grooves 311 in the shoulder land portions 31, the rigidity of the shoulder land portion 31 can be ensured.

In the pneumatic tire 1, the groove width (the maximum groove width Wg1 in FIG. 4) of the lug grooves 322A, 322B disposed in the land portion 32 is less than the groove width of the lug groove 311 disposed in the shoulder land portion 31 (see FIG. 2). This is advantageous in that the groove width of the lug grooves 322A, 322B is narrowed, allowing the ground contact area of the land portion 32 to be ensured. This is also advantageous in that the number of lug grooves 322A, 322B of the land portion 32 is increased, allowing the edge components of the land portion 32 to be increased.

Additionally, in the pneumatic tire 1, the land portion 32 includes a plurality of sipes 4 and the inclination direction of the sipes 4 disposed in the region on one side of the circumferential narrow groove 321 as a boundary is different from the inclination direction of the sipes 4 disposed in the region on the other side each other (see FIG. 3). This is advantageous in that the edge effect of the sipes 4 when the vehicle is turning is improved, and in particular, the turning performance of the tire on icy road surfaces is improved.

In the pneumatic tire 1, the land portion 32 is preferably disposed in the inner region in the vehicle width direction of the tire equatorial plane CL as a boundary when the tire is mounted on the vehicle (see FIG. 2). The second land portion 32 in the inner region in the vehicle width direction contributes greatly to the performance on snow and the performance on ice of the tire. Thus, giving the second land portion 32 in the inner region in the vehicle width direction the configuration described above is advantageous in that the performance on snow and the performance on ice of the tire can be efficiently achieved in a compatible manner.

A mounting direction indicator portion that specifies the mounting direction on the vehicle, for example, includes a mark or grooves/ridges on the sidewall portion of the tire. For example, Economic Commission for Europe Regulation 30 (ECE R30) requires that a mounting direction indicator portion is provided on the sidewall portion on the outer side in the vehicle width direction when the tire is mounted on a vehicle.

EXAMPLES

FIG. 6 is a table showing the results of performance tests of pneumatic tires according to embodiments of the technology.

In the performance tests, a plurality of different test tires were evaluated for: (1) braking performance on ice, (2) turning performance on ice, and (3) steering stability performance on snow. Test tires having a tire size of 195/65R15 91Q were mounted on specified rims having a rim size of 15×6J, adjusted to an air pressure of 210 kPa, and loaded with the specified load specified by JATMA. Also, the test tires were mounted on all wheels of a test vehicle, a front-engine front-drive (FF) sedan with an engine displacement of 1600 cc.

(1) In the evaluation relating to braking performance on ice, the test vehicle was driven on a predetermined icy road surface and the braking distance from a travel speed of 40 km/h was measured. The measurement results are expressed as index values and evaluated with the Conventional Example being assigned as the reference (100). In this evaluation, larger values are preferable.

(2) In the evaluation relating to turning performance on ice, the test vehicle was driven around in a circle with a 6-meter radius on a predetermined icy road surface and the travel time was measured. The measurement results are expressed as index values and evaluated with the Conventional Example being assigned as the reference (100). In this evaluation, larger values are preferable.

(3) In the evaluation relating to steering stability performance on snow, the test vehicle was driven on a predetermined snowy road surface at from 60 km/h to 100 km/h. Then the test driver performed a sensory evaluation regarding steering while lane changing and cornering and stability while traveling forward. Results of the evaluation are expressed as index values and evaluated with the Conventional Example being assigned as the reference (100). In this evaluation, larger values are preferable.

The test tires of Examples 1 to 10 have the configuration illustrated in FIGS. 1 to 3. The tread width TW is 156 mm. The groove width Wm of the outermost circumferential main groove 21 is 6.0 mm. The width W1 (see FIG. 3) of the second land portion 32 is 30 mm. The groove width Ws of the circumferential narrow groove 321 of the second land portion 32 is 2.0 mm. The ratio Ds/W1 is 0.50. In the test tire of Example 1, the lug grooves 322A, 322B of the second land portion 32 have a straight shape with a constant groove width Wg1 and are not provided with the narrow width portion 3222. In the test tire of Example 2, the lug grooves 322A, 322B of the second land portion 32 have the step-like shape illustrated in FIG. 4, and the groove width Wg1 of the broad width portion 3221 is 2.3 mm. The ratio L2/L1 of the arrangement interval of the lug grooves 322A, 322B of the second land portion 32 is 0.50. The sipe width of the sipes 4 is 0.4 mm.

The test tire of the Conventional Example has the configuration of Example 1 except that the second lug groove 322B of the second land portion 32 as illustrated in FIG. 3 has an open structure that extends through the second land portion 32. Also, all of the lug grooves 322A, 322B are inclined in the same direction with respect to the tire circumferential direction.

As can be seen from the test results, the test tires of Examples 1 to 10 achieve performance on snow and performance on ice in a compatible manner.

The invention claimed is:

1. A pneumatic tire, comprising:
two circumferential main grooves disposed in a region on one side of a tire equatorial plane as a boundary; and
a land portion defined by the two circumferential main grooves,
the land portion including a circumferential narrow groove extending in a tire circumferential direction and a plurality of sets of a first lug groove and a second lug groove that extend in a tire lateral direction through the circumferential narrow groove;
the first lug groove including an end portion that opens to an edge portion on one side of the land portion and another end portion that terminates within the land portion;
the second lug groove including an end portion that opens to another edge portion of the land portion and another end portion that terminates within the land portion;
the first lug groove and the second lug groove being alternately disposed in the tire circumferential direction; and
the first lug groove and the second lug groove being inclined in opposite directions to each other with respect to the tire circumferential direction; wherein
the land portion includes a plurality of blocks defined by the two circumferential main grooves, the circumferential narrow groove, and the plurality of sets of the first lug groove and the second lug groove;
the land portion does not have another lug groove connecting to the circumferential main grooves between adjacent of the first and second lug grooves; and
a distance D1 from the circumferential narrow groove to a terminating end portion of the first lug groove and the second lug groove and a width Wb1 of the block have a relationship $0.30 \leq D1/Wb1 \leq 0.70$, respectively.

2. The pneumatic tire according to claim 1, wherein
the land portion includes a plurality of blocks defined by the two circumferential main grooves, the circumferential narrow groove, and the plurality of sets of the first lug groove and the second lug groove; and
the blocks are arranged in a staggered manner around an entire circumference of the pneumatic tire.

3. The pneumatic tire according to claim 2, wherein
a ground contact area ratio of adjacent pairs of the blocks ranges from 0.80 to 1.20.

4. The pneumatic tire according to claim 1, wherein
an inclination angle $\theta$ of the first lug groove and the second lug groove with respect to the tire circumferential direction is in a range 40 degrees $\leq \theta \leq 85$ degrees.

5. The pneumatic tire according to claim 1, wherein
a groove width Wg1 of the first lug groove and the second lug groove at meeting positions with the circumferential narrow groove and a groove width Wg2 of the first lug groove and the second lug groove at the edge portions of the land portion have a relationship $Wg2<Wg1$.

6. The pneumatic tire according to claim 1, wherein
the first lug groove and the second lug groove have a step-like shape with a groove width narrowed at opening portions to the two circumferential main grooves.

7. The pneumatic tire according to claim 6, wherein
the land portion includes a plurality of blocks defined by the two circumferential main grooves, the circumferential narrow groove, and the plurality of sets of the first lug groove and the second lug groove; and
an extension distance D2 in the tire lateral direction of a narrow width portion of the step-like shape of the first lug groove and the second lug groove and a width Wb2 of the blocks including the narrow width portion have a relationship $0.20 \leq D2/Wb2 \leq 0.50$.

8. The pneumatic tire according to claim 1, wherein
intersection points of the first lug groove and the second lug groove with the circumferential narrow groove are defined as intersection points PA, PB; and
a distance L1 in the tire circumferential direction between intersection points PA, PA of an adjacent pair of the first lug grooves, and a distance L2 from the intersection point PA of the first lug groove to the intersection point PB of the second lug groove have a relationship $0.35 \leq L2/L1 \leq 0.65$.

9. The pneumatic tire according to claim 1, wherein
the circumferential narrow groove, the first lug groove, and the second lug groove have a groove depth less than a groove depth of the two circumferential main grooves.

10. The pneumatic tire according to claim 1, wherein
a total number N1 of the first lug groove and the second lug groove disposed in the land portion and a total number Nsh of lug grooves disposed in a shoulder land portion have a relationship $1.2 \leq N1/Nsh \leq 3.5$.

11. The pneumatic tire according to claim 1, wherein
a groove width of the first lug groove and the second lug groove disposed in the land portion is less than a groove width of lug grooves disposed in a shoulder land portion.

12. The pneumatic tire according to claim 1, wherein
the land portion includes sipes; and
an inclination direction of the sipes disposed in a region on one side of the circumferential narrow groove as a boundary is different from an inclination direction of the sipes disposed in a region on another side.

13. The pneumatic tire according to claim 1, wherein
the land portion is disposed in an inner region in a vehicle width direction of the tire equatorial plane as a boundary when the pneumatic tire is mounted on a vehicle.

14. A pneumatic tire, comprising:
two circumferential main grooves disposed in a region on one side of a tire equatorial plane as a boundary; and
a land portion defined by the two circumferential main grooves,
the land portion including a circumferential narrow groove extending in a tire circumferential direction and a plurality of sets of a first lug groove and a second lug groove that extend in a tire lateral direction through the circumferential narrow groove;
the first lug groove including an end portion that opens to an edge portion on one side of the land portion and another end portion that terminates within the land portion;
the second lug groove including an end portion that opens to another edge portion of the land portion and another end portion that terminates within the land portion;

the first lug groove and the second lug groove being alternately disposed in the tire circumferential direction; and a groove width Wg1 of the first lug groove and the second lug groove at meeting positions with the circumferential narrow groove and a groove width Wg2 of the first lug groove and the second lug groove at the edge portions of the land portion having a relationship Wg2≤Wg1; wherein the land portion does not have another lug groove connecting to the circumferential main grooves between adjacent of the first and second lug grooves.

15. A pneumatic tire, comprising:

two circumferential main grooves disposed in a region on one side of a tire equatorial plane as a boundary; and a land portion defined by the two circumferential main grooves, the land portion including a circumferential narrow groove extending in a tire circumferential direction and a plurality of sets of a first lug groove and a second lug groove that extend in a tire lateral direction through the circumferential narrow groove;

the first lug groove including an end portion that opens to an edge portion on one side of the land portion and another end portion that terminates within the land portion;

the second lug groove including an end portion that opens to another edge portion of the land portion and another end portion that terminates within the land portion;

the first lug groove and the second lug groove being alternately disposed in the tire circumferential direction;

the land portion including sipes; and an inclination direction of the sipes disposed in a region of the land portion on one side of the circumferential narrow groove as a boundary being different from an inclination direction of the sipes disposed in a region of the land portion on another side of the circumferential narrow groove; wherein the land portion does not have another lug groove connecting to the circumferential main grooves between adjacent of the first and second lug grooves.

16. The pneumatic tire according to claim 1, wherein the distance D1 from the circumferential narrow groove to the terminating end portion of the first lug groove and the second lug groove and the width Wb1 of the block have a relationship 0.40≤D1/Wb1≤0.70.

* * * * *